United States Patent
Nelson et al.

(10) Patent No.: US 7,993,124 B2
(45) Date of Patent: Aug. 9, 2011

(54) HEATING APPARATUS FOR A COMPOSITE LAMINATOR AND METHOD

(75) Inventors: Spencer G. Nelson, Snohomish, WA (US); Robert A. Kisch, Auburn, WA (US); Peter Vogeli, Seattle, WA (US); Richard Calawa, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 11/646,374

(22) Filed: Dec. 28, 2006

(65) Prior Publication Data

US 2008/0157437 A1 Jul. 3, 2008

(51) Int. Cl.
*B27G 11/02* (2006.01)
*H05B 3/02* (2006.01)
*B29B 17/00* (2006.01)

(52) U.S. Cl. .................. 425/174.4; 156/379.8; 219/483; 219/484; 219/539

(58) Field of Classification Search ............... 425/174.4; 156/379.8; 219/483, 484, 539
See application file for complete search history.

(56) References Cited

U.S. PATENT DOCUMENTS

| | | | |
|---|---|---|---|
| 3,663,798 A * | 5/1972 | Speidel et al. ........... 219/452.12 |
| 3,775,219 A | 11/1973 | Karlson et al. | |
| 3,810,805 A | 5/1974 | Hardesty et al. | |
| 4,797,172 A | 1/1989 | Hebert et al. | |
| 5,177,340 A | 1/1993 | Zaffiro | |
| 5,256,230 A | 10/1993 | Winkel | |
| 6,451,152 B1 | 9/2002 | Holmes et al. | |
| 6,534,904 B1 * | 3/2003 | Dieudonne et al. ........... 313/271 |
| 6,563,852 B1 * | 5/2003 | Baillargeon et al. ....... 372/45.01 |
| 2006/0118983 A1 * | 6/2006 | Cochran et al. ............. 264/40.6 |
| 2006/0180264 A1 | 8/2006 | Kisch et al. | |

FOREIGN PATENT DOCUMENTS

EP 1820 626 A 8/2007

OTHER PUBLICATIONS

Infrared heater [Online] XP002470414 Retrieved from the Internet: URL:http://en.wikipedia.org/wiki/Infrared_heating> [retrieved on Feb. 25, 2008].
Black Body Radiation [Online] XP002470415 Retrieved from the Internet: URL:http://www.arizonaenergy.org/Analysis/AroundWorld/Black%20Body%20Radiation.htm> [ retrieved on Feb. 25, 2008].

* cited by examiner

*Primary Examiner* — Yogendra Gupta
*Assistant Examiner* — Jeremiah Smith (57) ABSTRACT

To fabricate a composite item, an infrared heat source is energized and a composite material is dispensed. The composite material includes a reinforcement and a resin. In addition, the composite material is applied to a substrate of previously applied composite material. The infrared heat source is configured to emit a wavelength of electromagnetic radiation that is absorbed by the resin to a relatively greater extent than the wavelength of electromagnetic radiation is absorbed by the reinforcement.

22 Claims, 9 Drawing Sheets

FIG. 10

HEATING APPARATUS FOR A COMPOSITE LAMINATOR AND METHOD

TECHNICAL FIELD

The present disclosure generally relates to a lamination device. More particularly, the disclosure pertains to an apparatus for heating composite material dispensed from a composite laminator, and method of, heating composite material.

BACKGROUND

Composite items are typically constructed from layers of composite material that are laminated together. In general, composite materials include a reinforcement material and a resin or polymer matrix. The resin is typically sticky or tacky and becomes more so when warmed. This tacky property is beneficial during fabrication of the composite item e.g., when applying a layer of the composite material to a previously applied layer. However, many resins are hardened, polymerized or "cured" by heat and are therefore stored at relatively cool temperatures. Additionally, the tacky composite material tends to foul the lamination machine used to apply the composite material and may contaminate the workpiece or layup. For example, bit of resin may stick to and gather on rollers and chutes of the lamination machine. Periodically, these "resin balls" may be dislodged and fall onto the layup.

Therefore, composite materials are typically maintained at a relatively cool temperature until just prior to or during placement on the layup substrate. Conventionally, lamination machines include a blower to direct hot air upon the composite material. Unfortunately, only a small percentage of the thermal energy of the hot air is imparted upon the composite material with the remainder heating the lamination machine and work environment. This problem is exacerbated by increased lay down rates in which higher temperature air and higher air flow rates are employed to heat the faster moving composite material. Furthermore, the blowers generate relatively large amounts of noise that may be irritating to people nearby.

Accordingly, it is desirable to provide a method and apparatus capable of overcoming the disadvantages described herein at least to some extent.

SUMMARY

The foregoing needs are met, to a great extent, by the present disclosure, wherein in one respect a apparatus, system and method is provided that in some embodiments heats composite material during fabrication of a composite item.

An embodiment relates to a method of fabricating a composite item. In this method, an infrared heat source is energized and a composite material is dispensed. The composite material includes a reinforcement and a resin. In addition, the composite material is applied to a substrate of previously applied composite material. The infrared heat source is configured to emit a wavelength of electromagnetic radiation that is absorbed by the resin to a relatively greater extent than the wavelength of electromagnetic radiation is absorbed by the reinforcement.

Another embodiment pertains to a method of fabricating a composite item. In this method, an infrared heat source is energized and a composite material is dispensed. The infrared heat source includes a broadband black-body emitter. The composite material includes a reinforcement and a resin. In addition, the composite material is applied to a substrate of previously applied composite material. The infrared heat source is configured to emit a set of wavelengths of electromagnetic radiation that is absorbed by the resin.

Yet another embodiment relates to an apparatus for fabricating an aircraft component. The apparatus includes a composite material laminator and an infrared heat source. The composite material laminator applies a composite material on a substrate of previously applied composite material. The composite material includes a reinforcement and a resin. The infrared heat source selectively emits a wavelength of electromagnetic radiation that is absorbed by the resin to a relatively greater extent than the wavelength of electromagnetic radiation is absorbed by the reinforcement.

Yet another embodiment pertains to an apparatus for fabricating a composite item. The apparatus includes a means for energizing an infrared heat source, means for dispensing a composite material, and means for applying the composite material to a substrate of previously applied composite material. The composite material includes a reinforcement and a resin. The infrared heat source is configured to emit a wavelength of electromagnetic radiation that is absorbed by the resin to a relatively greater extent than the wavelength of electromagnetic radiation is absorbed by the reinforcement.

Yet another embodiment relates to an apparatus for fabricating a composite item. The apparatus includes a means for energizing an infrared heat source, means for dispensing a composite material, and means for applying the composite material to a substrate of previously applied composite material. The infrared heat source includes a broadband black-body emitter. The composite material includes a reinforcement and a resin. The infrared heat source is configured to emit a set of wavelengths of electromagnetic radiation that is absorbed by the resin.

There has thus been outlined, rather broadly, certain embodiments that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. In addition to the embodiments described, the various embodiments are capable of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the various embodiments.

DETAILED DESCRIPTION OF THE PREFERRED EMBODIMENT

Figure 1:
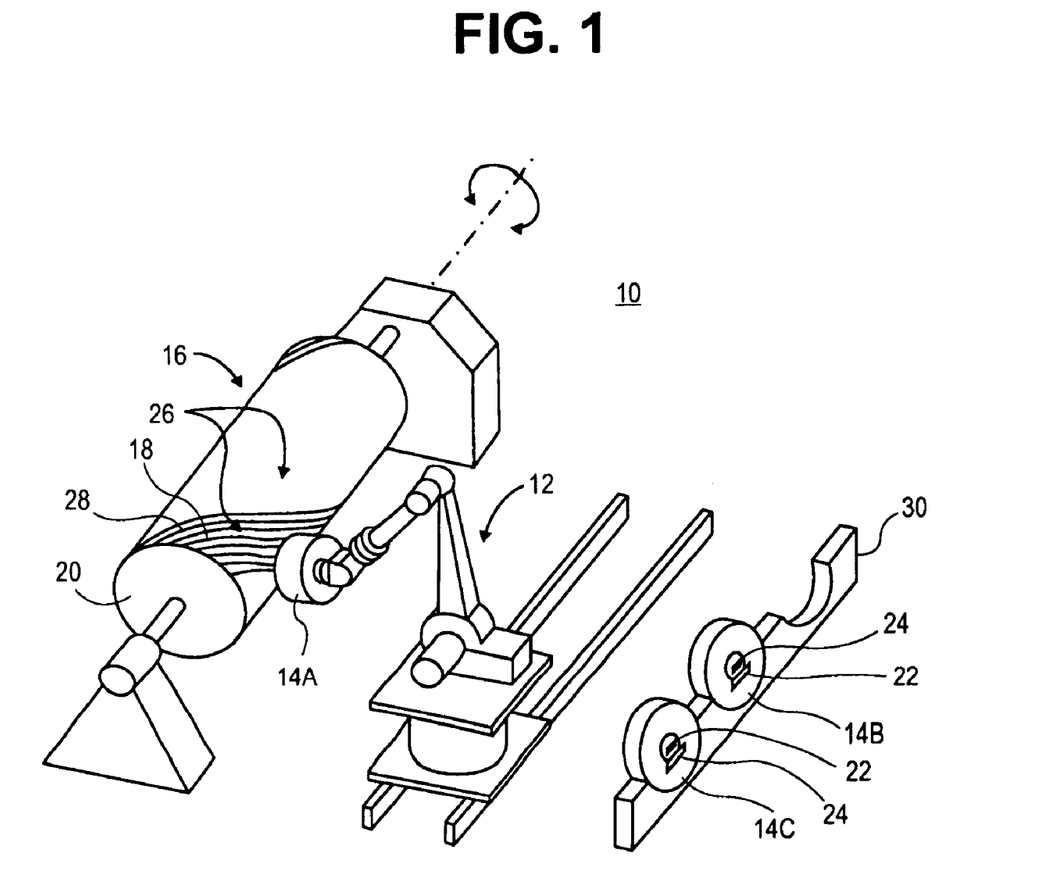
FIG. 1 is a perspective view of an automated lamination device according to an embodiment.

An embodiment will now be described with reference to the drawing figures, in which like reference numerals refer to like parts throughout. As shown in FIG. 1, a laminating device 10 suitable for use in an embodiment includes a positioning device 12 and an end effector 14a. The positioning device 12 is configured to position or otherwise control the movement of the end effector 14a. In an embodiment, the positioning device 12 is a robotic armature or gantry-type positioning device configured to control three to ten or more axes of movement. However, it is to be understood that the specific number of axes may depend upon the particular operating condition and thus, the number of axes controlled is not critical to the embodiments.

The laminating device 10 is configured to fabricate an item 16 by applying a course material 18 on a form 20. Suitable examples of items that may be fabricated by the lamination device 10 include, for example, aircraft and automotive components, sports and recreation equipment, and the like. The course material 18 includes any suitable composite material. Generally, the composite material includes a reinforcement and a resin.

The reinforcement includes, for example, fiber, fabric, tape, film, and foil. Within each of these categories, a multitude of diverse materials may be utilized. For example, the fibers may include, glass, carbon, boron, aramid, quartz, and the like. When these fibers are arranged as woven sheets and unidirectional ribbons, they are referred to as fabric and tape, respectively. To conform the fabric and/or tape to contoured surfaces, relatively narrow strips may be utilized. These narrow strips are referred to as "slit tape" or "tow."

The resin generally includes, for example, thermoset and thermoplastic resins. Thermoset resins include, epoxy, bismaleimide ("BMI") phenolic resins, polyurethane, polyester (PET), vinyl ester and polyimide resins. Thermoplastic resins include, acetal resins, polypropylene, polycarbonate, nylon, polyethersulfone (PES), polyetherimide (PEI), polyetheretherketone (PEEK), polyetherketone-ketone (PEKK), polyphenylenesulfide (PPS), and the like.

To facilitate adhesion of the course material 18 upon the form 20, the end effector 14a may include a heater 22 and sweep or compaction roller 24. As described herein, the heater 22 is configured to soften and increase the tack of the resin. The compaction roller 24 is configured to urge the course material upon the form 20 or a substrate 26. In this regard, the form 20 is configured to provide a suitably stable and finished surface or substrate for ply placement. The item 18 is typically fabricated from multiple layers or plies of the course material 18. As layers are applied, they then become the substrate 26 for subsequent layers.

As shown in FIG. 1, the form 20 is controlled to rotate about an axis. When controlled to rotate thusly, the form 20 is typically referred to as a mandrel. In other embodiments, the form 20 may be stationary or controlled to move in various axes. For example, the form 20 may be secured to a sliding table or X-Y table. In this regard, these and other embodiments in which the form 20 and/or the end effector 14a are controlled to move, one relative to the other, are within the scope of the various embodiments. Additionally, the movement of the form 20 and the positioning device 12 both act to position the end effector 14a. Furthermore, the movement of the form 20 and the positioning device 12 is generally coordinated to such a degree that the devices operate essentially as a single unit and thus, for the purpose of this disclosure, modulation of the positioning device 12 and/or the form 20 will be referred to with respect to the positioning device 12. Characteristics of the form 20, such as size, shape, contour, and the like, are based upon design parameters of an item 16. The item 16 is shown in FIG. 1 being constructed from a plurality of courses 28.

According to an embodiment illustrated in FIG. 1, the laminating device 10 further includes an off-line station 30 configured to retain a set of off-line end effectors 14b to 14n. The off-line end effectors 14b to 14n are each operable to be interchanged with the end effector 14a via a controllable quick release coupling. It is an advantage of various embodiments, that the set of off-line end effectors 14b to 14n facilitate greatly increased productivity. That is, in the event that a servicing operation is to be performed upon the end effector 14a, the end effector 14a is disposed upon the off-line station 30 and taken 'off-line' by disconnecting from the positioning device 12. The positioning device 12 then connects to an off-line end effector 14b to 14n and the laminating device continues to fabricate the item 16. A description and illustration of a lamination device with interchangeable end effectors may be found in co-pending U.S. patent application Ser. No. 11/055,975, filed Feb. 14, 2005, titled MODULAR HEAD LAMINATION DEVICE AND METHOD, the disclosure of which is incorporated herein by reference in its entirety.

Figure 2:
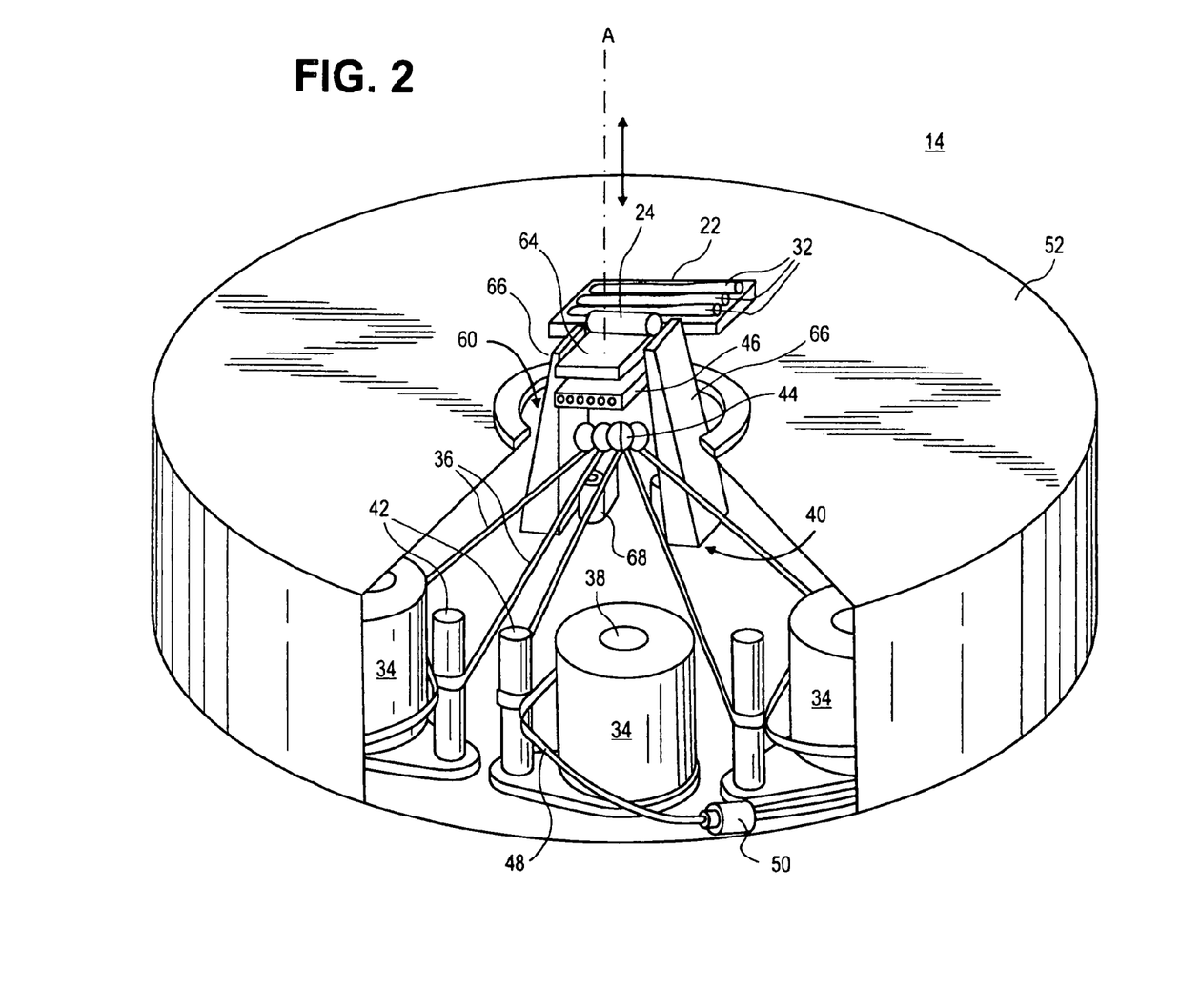
FIG. 2 is a perspective view of a front of an end effector that is suitable for use with the laminating device of FIG. 1.

FIG. 2 is a perspective view of a front of the end effector 14a that is suitable for use with the laminating device 10. As shown in FIG. 2, the heater 22 includes one or more infrared ("IR") emitters 32. As further shown in FIG. 2, the end effector 14a includes a set of spools 34 to dispense a tow 36. Each of the spools 34 is mounted on a respective spindle or tensioner 38. The tensioner 38 detachably secures the respective spool 34 to the end effector 14a and includes any suitable tensioning device such as, for example, a brake or motor to tension and otherwise modulate the rate at which the tow 36 is dispensed.

The end effector 14a further includes a path 40 for the tow 36 to follow as it travels from the spool 34 to a compaction roller 24. The path 40 includes a dancer roller 42 that dampens rapid changes in tow feed rates. The path 40 further includes a redirecting pulley 44 to guide the tow 36 into a cutting assembly 46. According to an embodiment, the dancer roller 42 and the redirecting pulley 44 are essentially fixed in angle relative to one another. Thus, the angle at which the tow 36 is introduced to the redirecting pulley 44 remains substantially constant even as the radius of the spool 34 decreases due to removal of the tow 36. The dancer roller 42 further facilitates a smooth removal of the tow 36 from the spool 34 and may further facilitate removal of an optional tow backing 48, if present. The tow backing 48 or separator film, if present, substantially prevents the tow 36 from adhering to itself while it is on the spool 34 or in roll form. To remove the tow backing 48, the end effector 14a optionally includes a backing removal system. The backing removal system includes any suitable system operable to draw off the tow backing 48 from the tow 36. Suitable backing removal systems include take up spools or reels and the like. In a particular embodiment, the end effector 14a includes a vacuum nozzle 50 in fluid communication with a vacuum source and configured to generate sufficient suction to draw off the tow backing 48.

From the redirecting pulley 44, the tow 36 is directed further along the path 40 and past a series of optional components such as, for example, combs, cutting assemblies, clamps, dancers, idlers and the like. Thereafter, the tow 36 is directed to the compaction roller 24.

Depending upon material characteristics of the tow 36, it may be advantageous to modulate environmental variable such as, for example, temperature, humidity, and the like. In addition, based on manufacturers specifications and/or empirically derived date, the storage and/or application conditions may differ. In this regard, the end effector 14a optionally includes a housing 52, environmental control assembly 54 (shown in FIG. 7), and chiller 58 (shown in FIG. 7). As shown in FIG. 2, the housing 52 encloses the set of spools 34 and thus, facilitates control over the environment in which the tow 36 resides by substantially retaining and/or directing flow of air supplied by the environmental control assembly 54. The housing 52 includes an opening 60 for the compaction roller 24 to address the form 20. In various embodiments, the housing is opaque, transparent, or at least partially transparent. For example, to facilitate visual inspection of the set of spools 34 and other components of the end effector 14a, the housing 52 includes a translucent or substantially transparent material such as, acrylic, polycarbonate, polyethylene, Lexan®, Plexiglas®, and the like.

According to an embodiment, the compaction roller 24 is optionally configured to move along an axis "A" relative to the end effector. The axis A is generally referred to as the compliance axis and allows the lamination device 10 to accommodate a slight (±1 to 20 mm) misalignment of the form 20 and/or unanticipated tow buildup on the form 20. In this regard, a compaction roller subassembly 64 is slidably secured to a pair of brackets 66. The compaction roller subassembly 64 is urged toward the form 20 via the action of one or more pneumatic cylinders 68.

Figure 3:
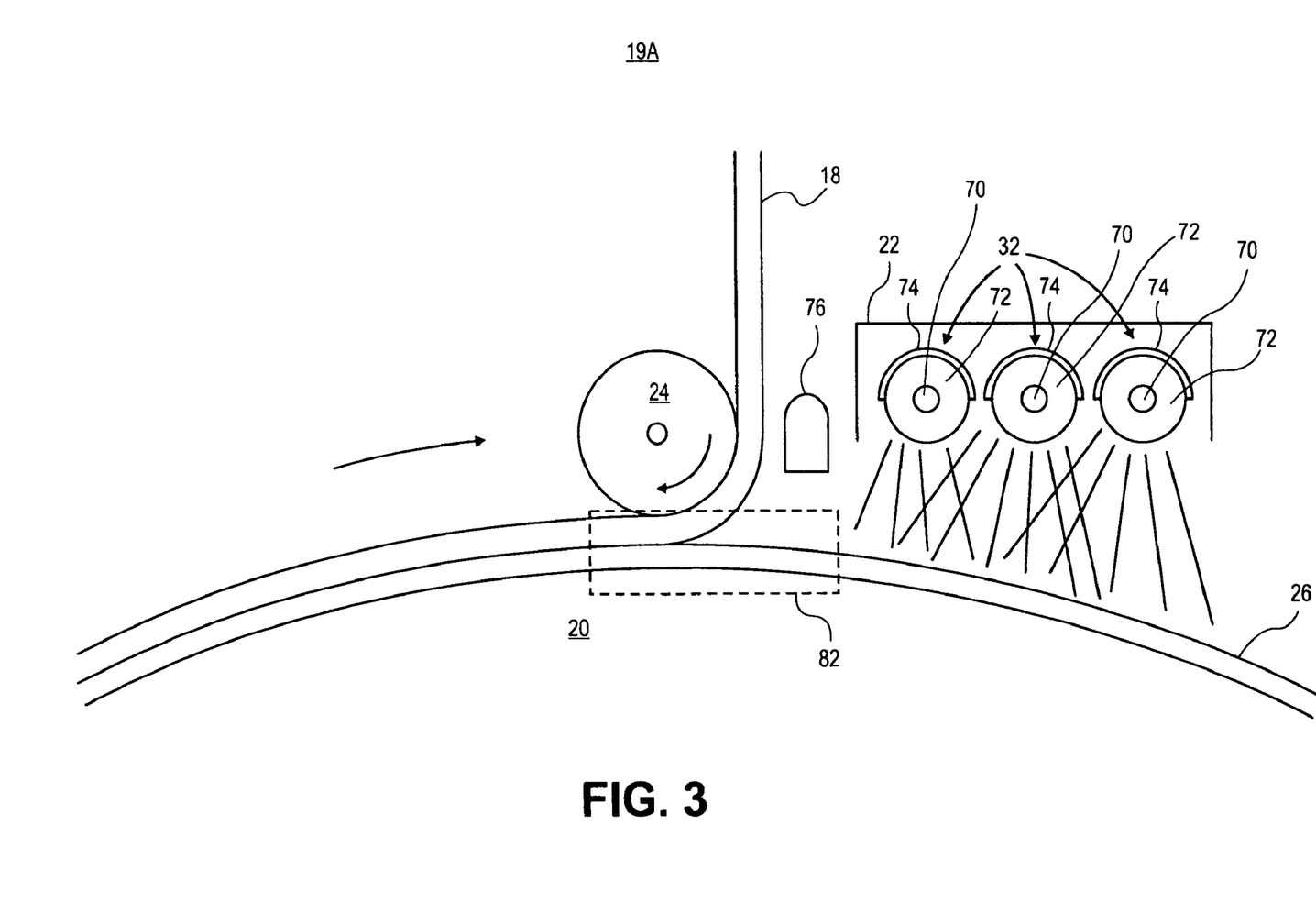
FIG. 3 is a simplified view of an end effector suitable for use with an embodiment that applies a course material upon a substrate.

FIG. 3 is a simplified view of the end effector 14a applying the course material 18 upon the substrate 26. As shown in FIG. 3, the IR emitters 32 are configured to emit IR radiation upon the substrate 26. In an embodiment, the IR emitters 32 are configured to emit one or more wavelengths or frequencies of electromagnetic radiation ("EMR") that is absorbed by resin in or on the substrate 26. The IR emitters 32 include any suitable IR generating device such as, for example a lamp, laser, heater, and/or broadband black-body emitter that covers some portion of the IR spectrum and/or the full IR spectrum. In general, the IR emitters 32 or lamps are operable to generate a wavelength, range of wavelengths, and/or set of wavelengths that are absorbed by the resin in or on the course material 18 and/or substrate 26. In a specific example, the IR emitters 32 may include a graphite element 70, quartz tube 72, and/or gold coating or reflector 74. In response to excitation, the graphite element 70 is configured to emit a wavelength and/or set of wavelengths of EMR that is absorbed by the resin in the course material 18 and/or the substrate 26. It is an advantage of embodiments that the IR emitters 32 emit or are tuned to emit one or more wavelengths of IR radiation that is absorbed by the resin.

In contrast, conventional heaters emit wavelengths of EMR that pass through the resin and that are absorbed by the reinforcement. This may delay the time it takes to bring the resin to an appropriate working temperature, resulting in a delayed feed rate and production time. In a particular example, high powered diode laser system only emit at single wavelength such as, 0.808 µm, 0.960 µm, and 1.064 µm, which will heat the carbon fiber. The heat from the carbon fiber is eventually conducted to any surrounding resin in the interior of the composite material and form there to the resin at the surface of the composite material.

To continue, the quartz tube 72 is configured to allow the wavelength and/or set of wavelengths of EMR to pass therethrough. In other embodiments, the quartz tube 72 may be omitted or replaced with any suitable material that is substantially transparent to the wavelength and/or set of wavelengths of EMR. The reflector 74 is configured to reflect or redirect the wavelength and/or set of wavelengths of EMR towards the course material 18 and/or the substrate 26. In various embodiments, the reflector 74 may be a layer that is applied to the quartz tube 72 and/or an essentially separate device to reflect or re-direct the wavelength and/or set of wavelengths of EMR towards the course material 18 and/or the substrate 26.

The end effector 14a optionally includes a sensor 76 to sense the temperature of the substrate 26 and/or the course material 18. If present, the sensor 76 may include any suitable sensor such as, for example, thermocouple, thermistor, IR temperature probe, and the like.

Figure 4:
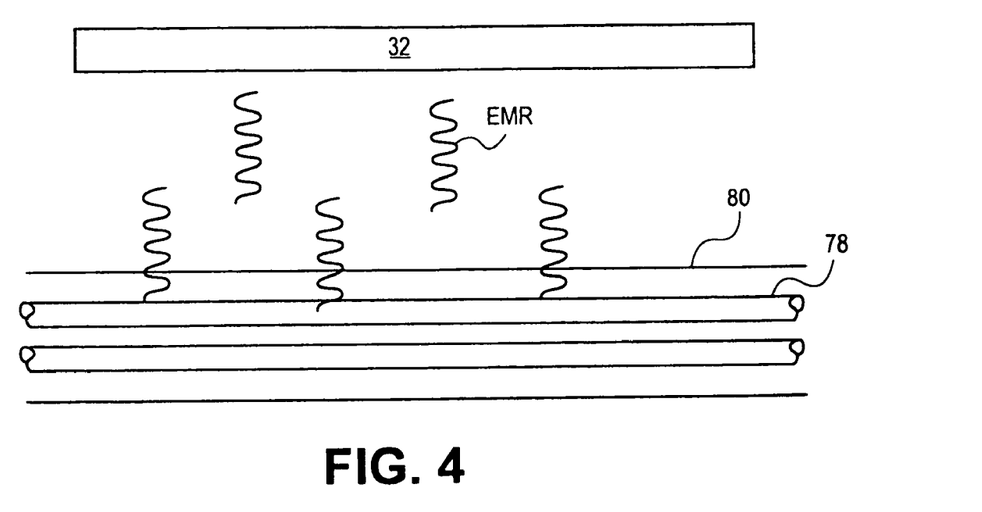
FIG. 4 is a detailed view of the course material suitable for use with an embodiment.

As shown in FIG. 4, graphite elements tend to generate a wavelength of EMR that is preferentially absorbed by carbon fibers which may be used as a reinforcement 78 in some composite materials. A resin 80 in thermal contact with the heated reinforcement 78 may, eventually, be heated conductively. However, this indirect heating of the resin 80 results in a delay between the exposure to the wavelength of EMR and the rise in temperature of the resin 80.

Figure 5:
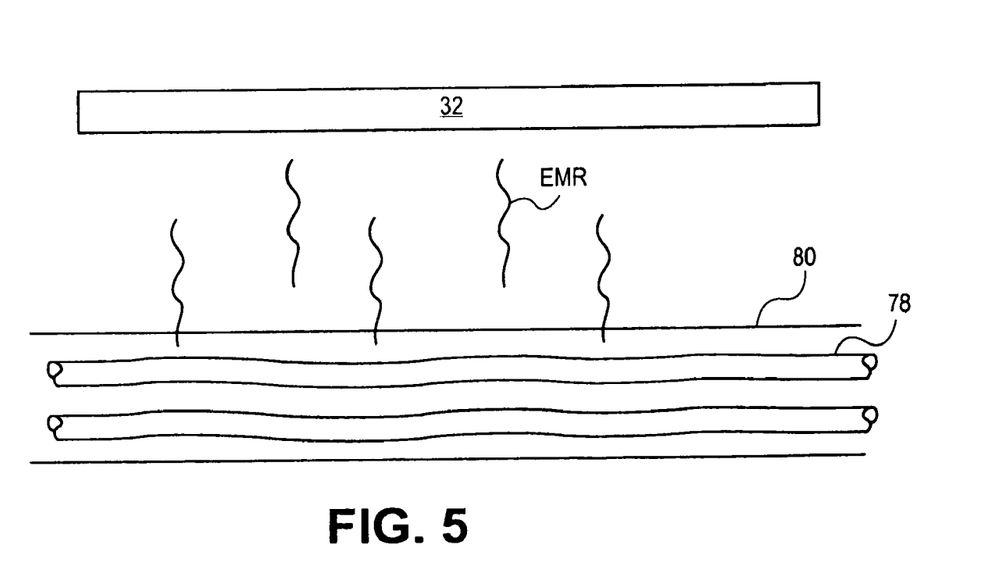
FIG. 5 is a detailed view of the course material suitable for use with an embodiment.

As shown in. 5, by tuning, controlling power to, or modulating the excitation of the graphite elements 70, the wavelength and/or set of wavelengths of EMR emitted by the IR emitters 32 may be controlled to essentially coincide with a wavelength and/or set of wavelengths of EMR that is absorbed by the resin 80 in the course material 18 and/or the substrate 26. By generating one or more wavelengths of EMR that are preferentially absorbed by the resin 80 rather than the reinforcement 78, the resin 80 may be heated more quickly and/or efficiently than heaters that emit wavelengths of EMR that are preferentially absorbed by the reinforcement 78 rather than the resin 80.

Figure 6:
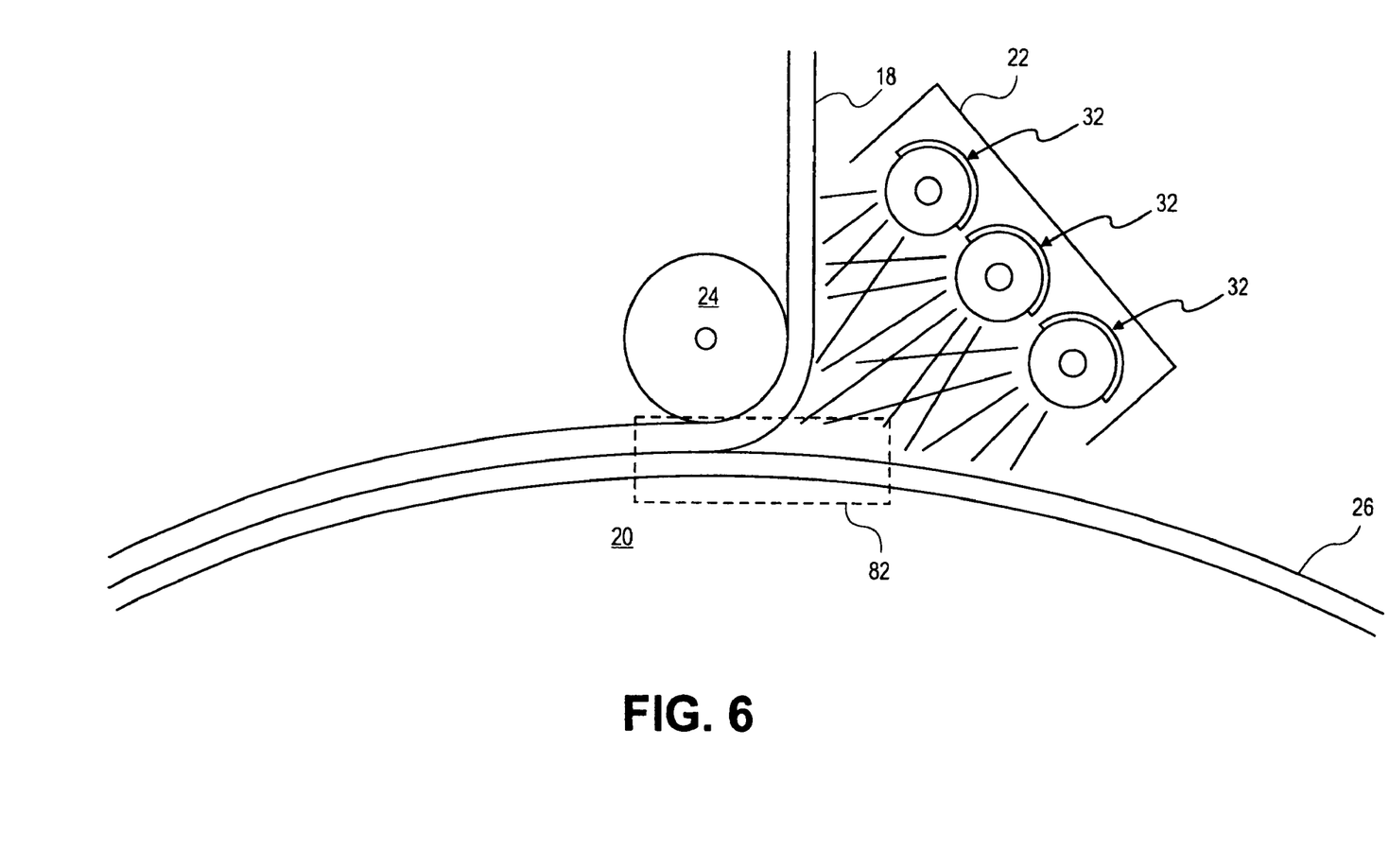
FIG. 6 is a simplified view of the end effector applying the course material upon the substrate according to another embodiment.

FIG. 6 is a simplified view of the end effector 14a applying the course material 18 upon the substrate 26 according to another embodiment. FIG. 6 is similar to FIG. 3 and thus, in the interest of brevity, those items described with reference to FIG. 3 will not be described again with reference to FIG. 6. As shown in FIG. 6, an interface 82 is formed where the course material 18 is applied to the substrate 26. To facilitate adhesion of the course material 18 to the substrate 26, it may be beneficial to raise the temperature of the resin 80 ("$Temp_r$") above a predetermined minimum temperature ("$Temp_{r-min}$"). The $Temp_{r-min}$ may be based upon a variety of factors such as, resin composition, heat retention of the substrate 26 and/or the course material 18, manufacturers recommendations, empirical data, and the like. In various embodiments, the heater 22 is configured to raise the $Temp_r$ above the $Temp_{r-min}$. More particularly, the heater 22 is configured to raise the $Temp_r$ above the $Temp_{r\text{-}min}$ at or near the interface 82. Furthermore, the heater 22 may be modulated to essentially prevent the $Temp_r$ from exceeding a predetermined maximum temperature ("$Temp_{r\text{-}max}$"). The $Temp_r$ max may be based upon a variety of factors such as, the resin composition, resin curing temperature, manufacturers recommendations, empirical data, and the like.

As shown in FIG. 6, the IR emitters 32 are configured to emit IR radiation upon the substrate 26 and the course material 18. In this regard, in various embodiments, the heater 22 may be configured to direct EMR at the course material 18, the substrate 26, or some combination thereof.

Figure 7:
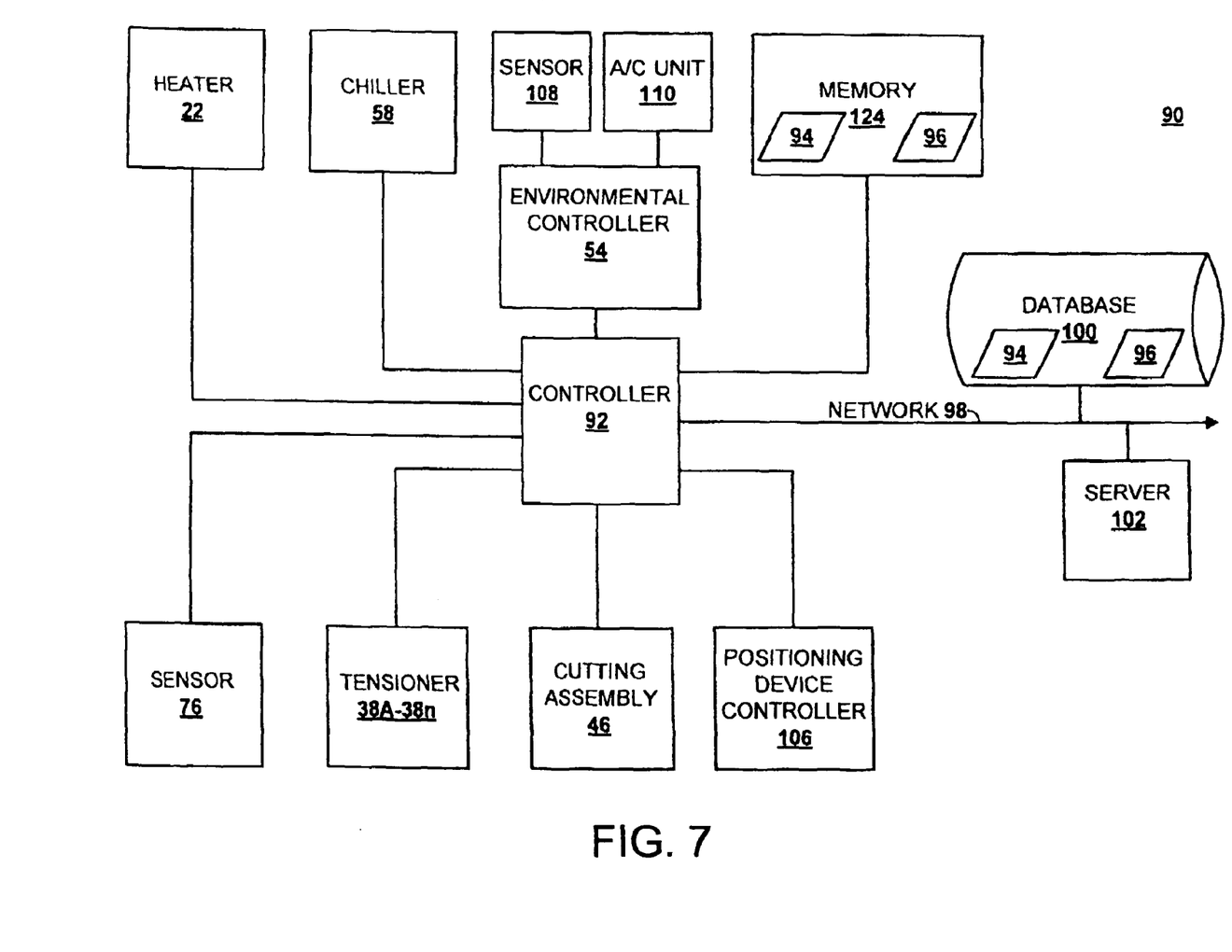
FIG. 7 is a block diagram of a system suitable for use with the laminating device of FIG. 1.

FIG. 7 is a block diagram of a system 90 suitable for use with the laminating device 10. As shown in FIG. 7, the system 90 includes a controller 92. The controller 92 is operable to execute computer readable code. In this regard, the system 90 includes a set of computer readable instructions or code 94. According to the code 94, the controller 92 is configured to access a file 96. This file 96 includes one or more of the following: a computer readable model of the composite item 16; a computer readable representation of the surface of the layup form or the form 20; a computer readable representation of the edges of the form 20; the thickness of the composite item 16; a source code based upon at least one of the composite item 16 and the form 20; a set of movement instructions based upon the source code; data gathered while laying up the composite item 16; timestamp information; positional information; identification numbers; and the like. The controller 92 is further configured to communicate across a network 98. The network 98 is optionally included to provide additional data storage and/or processing capabilities. In this regard, the network includes a database 100 and a server 102. The database 100 is configured to store a copy of the code 94 and/or file 96. The server 102 is configured to generate, store, and perform any suitable processing of the code 94 and/or file 96. In this manner, composite items, such as the composite item 16, generated on computer aided design (CAD) machines such as the server 102, for example, may be forwarded to the laminating device 10. In addition, the server 102 is operable, via the network 98, to forward updates for the code 94 and/or file 96. In addition, the system 90 optionally includes a memory 124. If present, the memory 124 is configured to store a copy of the code 94 and/or file 96.

Also shown in FIG. 7 is a positioning device controller 106. The positioning device controller 106 is optionally included in the system 90 depending upon the requirements of the various actuators and/or servo motors of the laminating device 10. That is, depending upon the particular configuration of the laminating device 10, a plurality of actuators and/or servo motors modulate the rotation, position, speed, direction, and the like of the various components of the laminating device 10. More particularly, these actuators and/or servo motors of the positioning device 12 are at least configured to modulate the various axes of the end effector 14a and/or laminating device 10. If present, parameters of the positioning device controller 106 are based upon the specification of the various actuators, servos, and/or the controller 92. The positioning device controller 106, if present, is configured to control some or all of these actuators and/or servo motors. In addition, these actuators and/or servo motors are optionally operable to be modulated by the controller 92 directly, and thus, the system 90 may omit the positioning device controller 106.

The controller 92 is further configured to substantially maintain the $Temp_r$ above the $Temp_{r\text{-}min}$ and below the $Temp_{r\text{-}max}$. For example, the controller 92 may be configured to provide power to the heater 22 and thereby energize the elements 70 to emit the wavelength or set of wavelengths that are absorbed by the resin 80. In addition, the controller 92 may be configured to receive signals from the sensor 76 and, based upon the sensed temperature, modulate the heater 22 to maintain the $Temp_r$ above the $Temp_{r\text{-}min}$ and below the $Temp_{r\text{-}max}$. Furthermore, depending upon the speed or lay down rate at which the course material 18 is being applied to the substrate 26, the controller 92 may modulate the heater 22. For example, in response to an increase in the lay down rate, the controller 92 may modulate the heater 22 to emit a relatively greater amount of the wavelength or set of wavelengths that are absorbed by the resin 80. In response to a decrease in the lay down rate, the controller 92 may modulate the heater 22 to emit a relatively lesser amount of the wavelength or set of wavelengths that are absorbed by the resin 80.

In addition, the controller 92 is configured to modulate the plurality of tensioners 38. For example, depending upon the speed, direction of travel, turning radius, and the like, the controller 92 is configured to individually control an amount of resistance each tensioner 38 offers. In this manner, each tow 36 is controlled.

Optionally, the controller 92 is configured to control and/or communicate with a variety of other devices such as the environmental control assembly 54, chiller 58, and the like. As described herein, the environmental control assembly 54 is optionally provided to modulate the environment within the housing 52. In this regard, the environmental control assembly 54 is configured to receive signals from a housing sensor 108 and, based on these signals, control an air conditioning ("A/C") unit 110. The housing sensor 108 is configured to sense the environment within the housing 52 and generate a signal based on the environmental conditions. The A/C unit 110 is configured to direct a flow of conditioned air within the housing 52. The chiller 58 is optionally provided to reduce the temperature of the cutting assembly 46, and various other components such as, for example, restart rollers, and the like. A vacuum source is optionally provided to supply vacuum to the vacuum nozzle 50.

The system 90, optionally, further includes a plurality of sensors configured to sense the various suitable operating conditions or attributes of the laminating device 10. Examples of suitable attributes include some or all of the temperature of the tow 36, the temperature at the location where the separator film 48 is separated from the tow 36 (release point), feed rate and direction, material placement, backing integrity, supply of tow 36, and/or the like.

Figure 8:
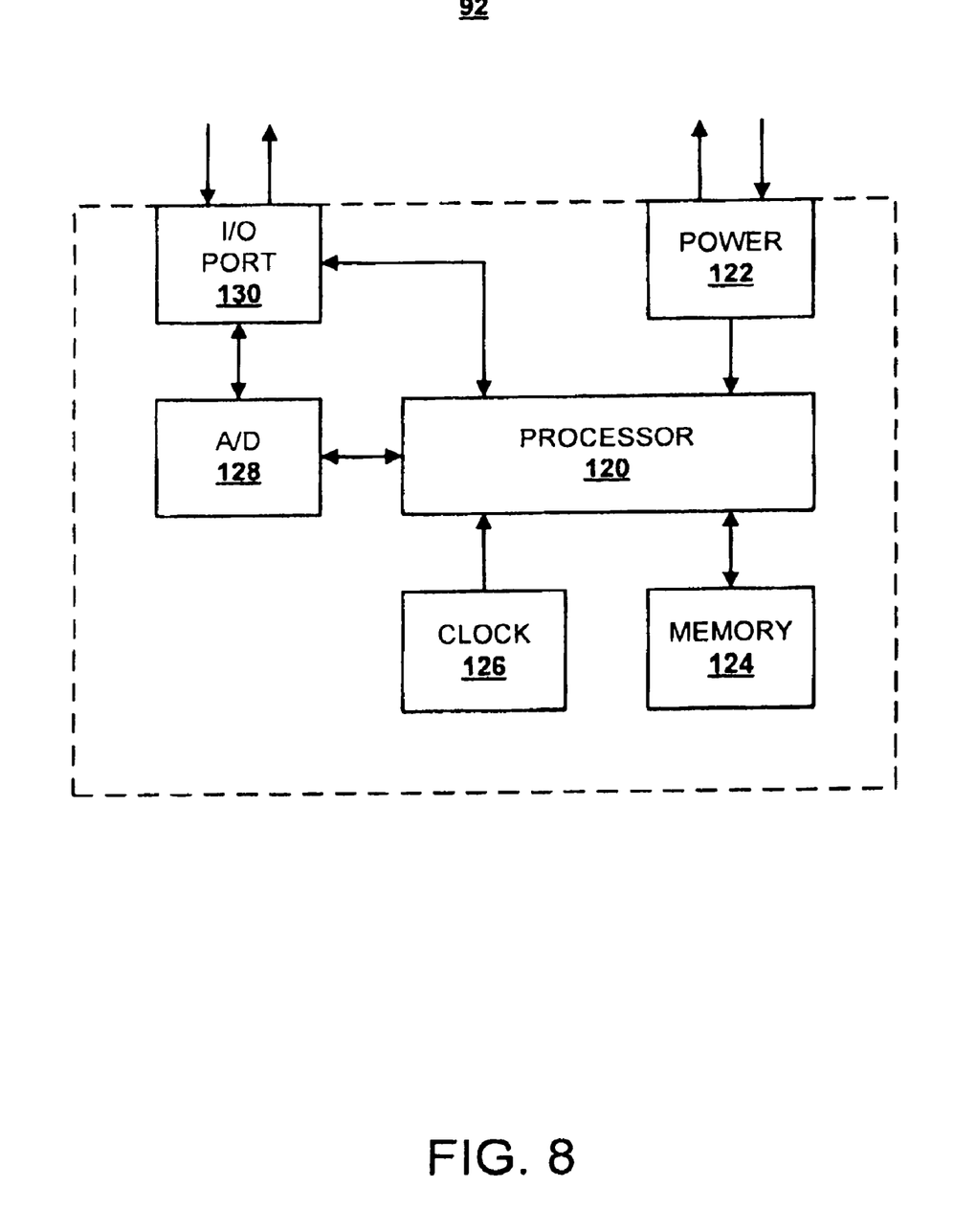
FIG. 8 is a system architecture for a controller suitable for use in the laminating device of FIG. 1.

FIG. 8 is a system architecture for the controller 92 suitable for use in the system 90. As shown in FIG. 8, the controller 92 includes a processor 120. This processor 120 is operably connected to a power supply 122, memory 124, clock 126, analog to digital converter (A/D) 128, and an input/output (I/O) port 130. The I/O port 130 is configured to receive signals from any suitably attached electronic device and forward these signals to the A/D 128 and/or the processor 120. If the signals are in analog format, the signals may proceed via the A/D 128. In this regard, the A/D 128 is configured to receive analog format signals and convert these signals into corresponding digital format signals. Conversely, the A/D 128 is configured to receive digital format signals from the processor 120, convert these signals to analog format, and forward the analog signals to the I/O port 130. In this manner, electronic devices configured to receive analog signals may intercommunicate with the processor 120.

The processor 120 is configured to receive and transmit signals to and from the A/D 128 and/or the I/O port 130. The processor 120 is further configured to receive time signals from the clock 126. In addition, the processor 120 is configured to store and retrieve electronic data to and from the memory 124. Furthermore, the processor 120 is configured to receive signals from the sensor 76 and determine signals operable to modulate the heater 22 and thereby maintain the $Temp_r$ above the $Temp_{r\text{-}min}$ and below the $Temp_{r\text{-}max}$. Moreover, processor 120 is configured determine signals operable to modulate the positioning device controller 106 and thereby control the various actuators and/or servo motors of the laminating device 10 to exert a particular force and/or rotate to a particular degree.

According to an embodiment, the processor 120 is configured to execute the code 94. Based on this set of instructions and signals from the various components of the laminating device 10, the processor 120 is configured to: determine a set of movement instructions; modulate the heater 22, chiller 58, cutting assembly 46, and the like.

Figure 9:
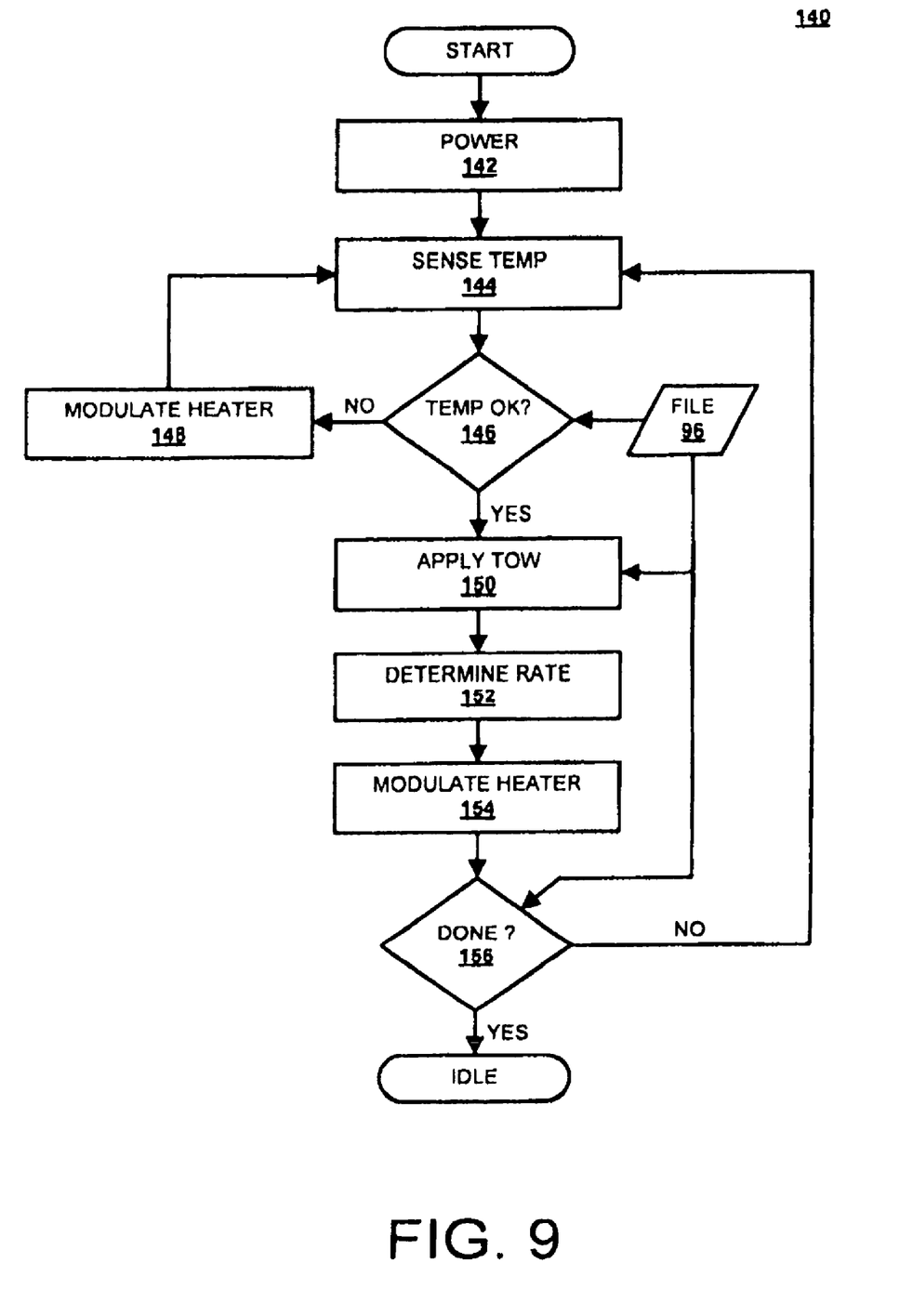
FIG. 9 illustrates steps involved in a method of placing tow to fabricate a composite item in accordance with the laminating device of FIG. 1.

FIG. 9 illustrates steps involved in a method 140 of placing the tow 36 to fabricate the composite item 16. Prior to the initiation of the method 140, a composite product is designed and, based on this design, a series of computer readable instructions specifying attributes of the composite product, such as the item 16, is generated. In addition, attributes or characteristics of the tow 36 are determined based upon characteristics of the item 16. For example, the reinforcement 78 and resin 80 may be based upon the designed load and performance characteristics of the item 16. In a particular example, an aircraft fuselage may include a multitude of carbon fiber reinforcement with a BMI resin. To affix each successive ply to the underlying substrate, it may be beneficial to raise the temperature of the BMI resin to increase the tack of the resin and facilitate adhesion. These and other such parameters are included in the file 96 that contains the computer readable instruction and is accessed to fabricate the item 16.

In addition, a form or tool such as the form 20 is designed and constructed based upon the design of the composite product. Furthermore, the spools 34 are installed in the end effector 14a and the tow 36 is threaded through the end effector 14a.

At step 142, the method 140 is initiated by powering or turning on the various components of the laminating device 10 described herein above and executing the computer readable instructions in the file 96.

At step 144, the temperature of the resin 80 is determined. For example, the controller 92 queries the sensor 76 to determine the temperature of the resin 80 at or near the interface 82.

At step 146, it is determined if the sensed temperature is appropriate. For example, the controller 92 accesses the file 96 to determine if the $Temp_r$ is above the $Temp_{r\text{-}min}$ and below the $Temp_{r\text{-}max}$. If it is determined that the $Temp_r$ is not appropriate, the heater 22 is modulated at step 148. If it is determined that the $Temp_r$ is appropriate, the tow 36 is applied at step 150.

At step 148, the heater 22 is modulated accordingly. For example, if the $Temp_r$ is at or below the $Temp_{r\text{-}min}$ the heater 22 may be modulated to increase the emission of the wavelength or set of wavelengths that are absorbed by the resin 80. In another example, if the $Temp_r$ is at or above the $Temp_{r\text{-}max}$ the heater 22 may be modulated to decrease the emission of the wavelength or set of wavelengths that are absorbed by the resin 80. In this manner, the controller 92 may maintain the $Temp_r$ above the $Temp_{r\text{-}min}$ and below the $Temp_{r\text{-}max}$. Following the step 148, the $Temp_r$ may be sensed at step 144.

At step 150, the tow 36 is applied to the form 20. More particularly, according to the file 96, the controller 92 modulates the lamination device 10 to apply the tow 36 to the substrate 26. For example, a start location, path, and end location for a course is retrieved from the file 96 and the controller 92 modulates the various components of the laminating device 10 to tack the tow 36 to the start location, draw out and compact the tow 36 along the path, and cut the tow 36 at the end location.

At step 152, a lay up rate is determined. For example, during application of the tow 36 to the form 20, the relative movement of the end effector 14a to the form 20 may be determined.

At step 154, the heater 22 is modulated in response to the determined lay up rate. For example, as the end effector 14a accelerates from a relatively low rate or a zero rate to a relatively higher rate, the heater 22 is controlled to increase the emission of the wavelength or set of wavelengths that are absorbed by the resin 80. In another example, as the end effector 14a decelerates from a relatively high rate to a relatively lower rate, the heater 22 may be modulated to decrease the emission of the wavelength or set of wavelengths that are absorbed by the resin 80. In this manner, the controller 92 may utilize the lay down rate to facilitate maintaining the $Temp_r$ above the $Temp_{r\text{-}min}$ and below the $Temp_{r\text{-}max}$.

At step 156, it is determined whether the layup for the item 16 is complete. For example, if the controller 92 determines an end of file ("EOF") statement has been retrieved from the file 96, it is determined the layup of the item 16 is complete and the laminator 10 is controlled to idle until further instructions are received. If it is determined that further layup protocols are present in the file 96, the temperature of the resin may be sensed at step 144.

Following the method 140, the item 16 or composite product may be cured in any suitable manner. In the aerospace industry, thermoset resins are generally utilized to pre-impregnate ply material. These thermoset resins are typically cured at an elevated temperature and pressure for a predetermined amount of time. Times, pressures, and temperatures may be selected depending on the resin used, the size and thickness of the composite product, and the like.

Although an example of the end effector 14a is shown being controlled by the positioning device 12, it will be appreciated that other control systems can be used. In this regard, a gantry system, guided vehicle, or other such positioning devices that support and control the movement of any suitable end effector are suitable for use with end effector 14a. Also, although the laminating device 10 is useful to place plies for composite products in the airline industry it can also be used in other industries that construct composite product. These industries include, but are not limited to, automobile, marine, spacecraft, building, and consumer products.

Figure 10:
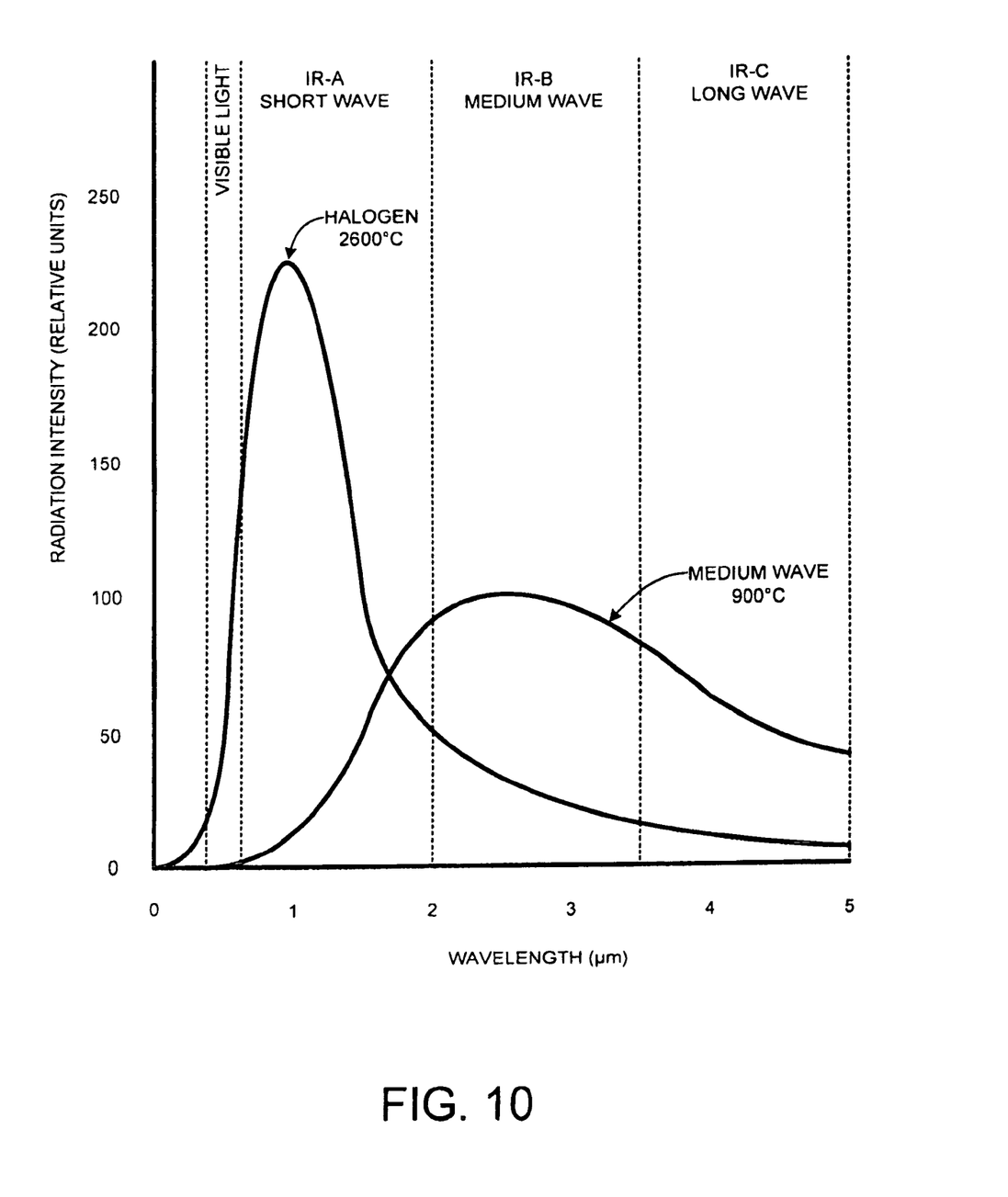
FIG. 10 is an example of a graph of wavelength in μm (abscissa) as it affects the relative radiation output intensity (ordinate) of a conventional halogen IR emitter as compared to an IR emitter suitable for use with an embodiment.

FIG. 10 is an example of a graph of wavelength in μm (abscissa) as it affects the relative radiation output intensity (ordinate) of a conventional halogen IR emitter as compared to an IR emitter suitable for use with an embodiment. As shown in FIG. 10, the range of wavelengths emitted by a conventional halogen bulb is most intense between 0.5 μm and 1.5 μm. Resin such as the resin 80 is essentially transparent to this range of IR radiation. Instead, the IR radiation emitted by conventional halogen bulb is absorbed by carbon fibers that are heated and the heat is then conducted to nearby resin. In contrast, the range of wavelengths emitted by the IR emitter 32 is most intense between 1.5 μm and 4.5 μm. In addition, although not explicitly shown in FIG. 10, the range of wavelengths emitted by the IR emitter 32 extends from about 1 μm to about 10 μm. The resin 80 readily absorbs IR radiation in this range of wavelengths. As such, the IR radiation emitted by the IR emitter 32 is absorbed by the resin 80 in or on the course material 18 and/or substrate 26 which may accelerate the speed at which the resin 80 is heated to an appropriate working temperate. It is to be understood that the graph illustrated in FIG. 10 is for illustrative purposes only, and thus, the respective curvatures, slopes and y-intercepts may be the same or different depending on the response of the various IR emitters 32.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. An apparatus for fabricating an aircraft component, the apparatus comprising:
   a composite material laminator to apply a composite material on a substrate of previously applied composite material, the composite material comprising a reinforcement and a resin;
   a plurality of graphite elements each tending to generate a wavelength of electromagnetic radiation that is preferentially absorbed by the reinforcement, the graphite elements being tunable by receiving controlled power to cause the graphite elements to selectively emit a range of wavelengths of electromagnetic radiation that are preferentially absorbed by the resin to a relatively greater extent than the range of wavelengths of electromagnetic radiation that are absorbed by the reinforcement; and
   a controller controlling the power to the graphite elements in a manner to cause the graphite elements to emit the range of wavelengths of electromagnetic radiation that are preferentially absorbed by the resin to the relatively greater extent than the range of wavelengths of electromagnetic radiation that are absorbed by the reinforcement.

2. The apparatus according to claim 1, further comprising: a sensor to sense a resin temperature.

3. The apparatus according to claim 2, wherein: the controller is configured to control the graphite heating elements to raise the resin temperature to a predetermined working temperature.

4. The apparatus according to claim 3, wherein the controller is further configured to increase a lay down rate at which the composite material is applied and increase the output of the graphite heating elements in response to the increased lay down rate.

5. The apparatus according to claim 3, wherein the controller is further configured to decrease a lay down rate at which the composite material is applied and decrease the output of the graphite heating elements in response to the decreased lay down rate.

6. The apparatus according to claim 1, wherein the graphite heating elements are directed towards the substrate.

7. The apparatus according to claim 1, wherein the graphite heating elements are directed towards the composite material being applied.

8. The apparatus according to claim 1, further comprising:
   a reflector for reflecting the electromagnetic radiation towards at least one of the substrate and the composite material being applied.

9. The apparatus according to claim 1, further comprising: a plurality of quartz tubes, each quartz tube surrounding a single graphite element.

10. The apparatus according to claim 9, further comprising: a gold layer to coat at least one quartz tube.

11. The apparatus according to claim 1, wherein the reinforcement comprises a multitude of carbon fibers.

12. The apparatus according to claim 1, wherein the resin comprises a thermoset resin.

13. An apparatus for fabricating a composite item, the apparatus comprising:
   means for energizing an infrared heat source;
   means for dispensing a composite material, the composite material comprising: a reinforcement; and a resin;
   means for applying the composite material to a substrate of previously applied composite material, the infrared heat source including a plurality of graphite heating elements each tending to generate a wavelength of electromagnetic radiation that is preferentially absorbed by the reinforcement, the graphite elements being tunable by receiving controlled power to cause the graphite elements to emit a range of wavelengths of electromagnetic radiation that are preferentially absorbed by the resin to a relatively greater extent than the range of wavelengths of electromagnetic radiation that are absorbed by the reinforcement; and
   means for controlling the power to the graphite elements in a manner to cause the graphite elements to emit the range of wavelengths of electromagnetic radiation that are preferentially absorbed by the resin to the relatively greater extent than the range of wavelengths of electromagnetic radiation that are absorbed by the reinforcement.

14. The apparatus according to claim 13, further comprising: means for sensing a resin temperature.

15. The apparatus according to claim 14, further comprising:
   means for modulating an output of the infrared heat source to raise the resin temperature to a predetermined working temperature.

16. The apparatus according to claim 15, further comprising:
   means for increasing a lay down rate at which the composite material is applied; and
   means for increasing the output of the infrared heat source in response to the increased lay down rate.

17. The apparatus according to claim 15, further comprising:
   means for decreasing a lay down rate at which the composite material is applied; and
   means for decreasing the output of the infrared heat source in response to the decreased lay down rate.

18. The apparatus according to claim 13, further comprising:
   means for directing the infrared heat source towards the substrate.

19. The apparatus according to claim 13, further comprising:
   means for directing the infrared heat source towards the composite material being applied.

20. The apparatus according to claim 13, further comprising:
   means for reflecting the electromagnetic radiation towards at least one of the substrate and the composite material being applied.

21. The apparatus according to claim 1, wherein:
the graphite elements are tuned to emit a range of wavelengths of electromagnetic radiation being most intense between approximately 2 microns and 3 microns.

22. The apparatus according to claim 13, wherein:
the graphite heating elements are tuned to emit a range of wavelengths of electromagnetic radiation being most intense between approximately 2 microns and 3 microns.

* * * * *